July 28, 1970  D. G. SMITH ET AL  3,521,618
DOOR LOCKING ASSEMBLY

Filed Feb. 3, 1969  2 Sheets-Sheet 1

INVENTORS
DAVID GIBBONS SMITH
HELMUT LUDWIG HAGENBUCH.
BY Maybee & Legris
ATTORNEYS

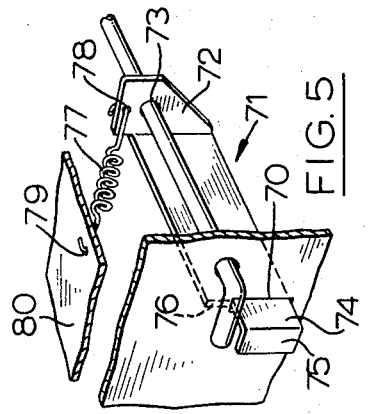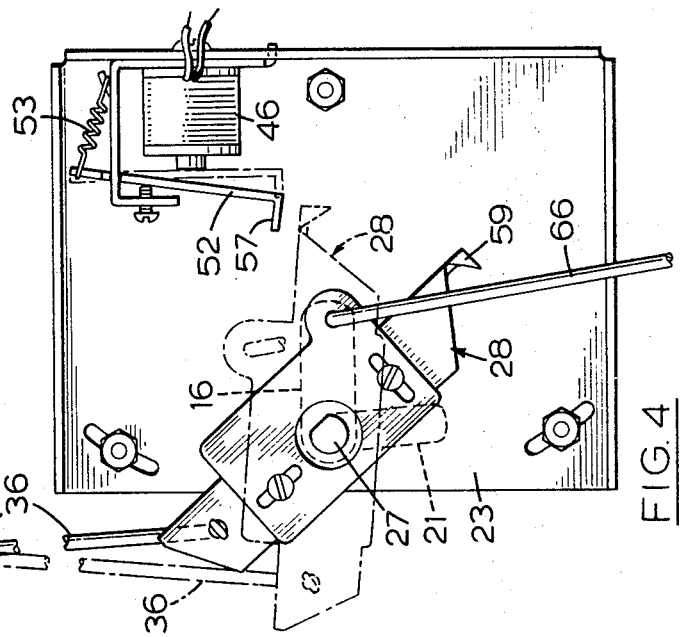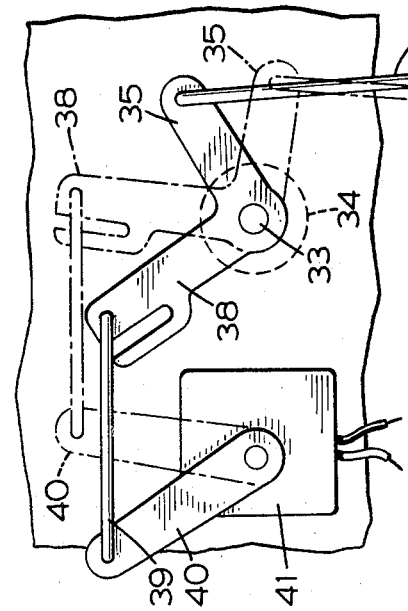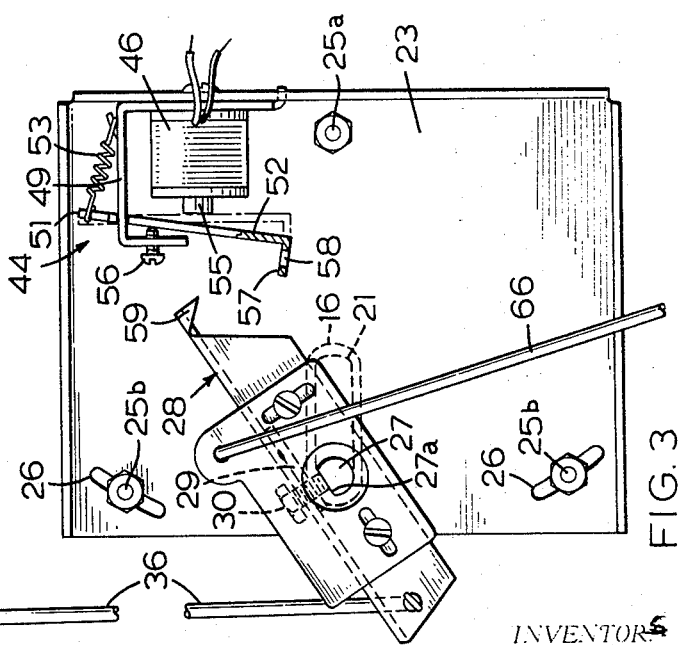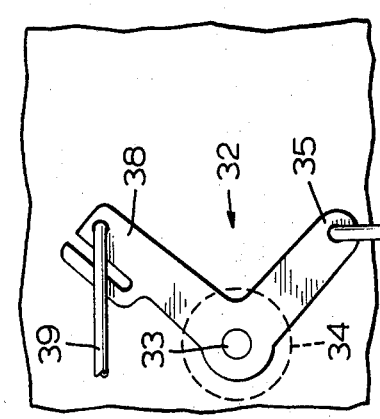

United States Patent Office 3,521,618
Patented July 28, 1970

3,521,618
DOOR LOCKING ASSEMBLY
David Gibbons Smith, Toronto, Ontario, and Helmut Ludwig Hagenbuch, Downsview, Ontario, Canada, assignors to Moffats, Limited, Weston, Ontario, Canada, a company
Filed Feb. 3, 1969, Ser. No. 795,968
Claims priority, application Great Britain, Feb. 8, 1968, 6,030/68
Int. Cl. F24c 15/04
U.S. Cl. 126—197                              3 Claims

ABSTRACT OF THE DISCLOSURE

A door locking device for an oven having a high temperature cleaning cycle in which the door cannot be locked unless the stove is connected to a source of power, and when locked, can be unlocked when the oven is below a certain temperature but cannot be unlocked so long as the oven is above that certain temperature.

---

The present invention relates to a door locking assembly by means of which the access door to the oven of a cook stove may be locked in the closed position when the oven is operating in a high temperature range above normal cooking temperatures.

In recent years, the cook stove industry has developed an oven by means of which food soil on the walls of the oven cavity may be removed by pyrolysis. The pyrolitic action within the oven takes place at a temperature range substantially above normal cooking temperatures, normally in a range of somewhere between 800° F. and 1000° F. At temperatures within this range, it is important that the housewife be unable to open the oven door since the escape of hot air would constitute a serious hazard and since the interior of the oven would be subject to thermal shock which might cause damage to the enamel on the internal oven surfaces and which might cause shattering of the glass in the window of the oven door.

While it is a relatively simple mechanical problem to provide a lock which will enable a door to be secured in a closed position, the provision of such a locking mechanism in association with a cook stove of the kind described poses additional problems. First, it is desirable that is should be impossible to inadvertently lock the door when the oven is in the low temperature range so that normal access to the oven during normal cooking operations is not impeded.

Second, it is desirable that the high temperature cycle of the oven should automatically ensure that it is impossible to unlock and open the door during the period of time that the oven is operating within the high temperature range.

Third, it is desirable that the door locking mechanism be such that when the stove is on display and not connected to a source of power, that is be impossible to lock the door since, in the preferred embodiment of the present invention, once the door has been locked, it cannot be unlocked without the application of electrical energy to certain components.

The objectives set forth above are achieved by the present invention according to which, a door locking assembly comprises a first locking element rotatable from an unlocked position to a locked position, said element being linked to an electromechanical latching arrangement by means of which locking of the door is prevented except as a result of a sequential series of operations and which, once the door has been locked and the oven is operating in the high temperature range, cannot be unlocked until the temperature falls below the lower limit of the said high temperature range.

The present invention will be described with reference to a preferred embodiment which is illustrated in the accompanying drawings in which like reference numerals denote like parts and in which:

FIG. 3 is a fragmentary view of the operative components of the door locking assembly with the door in the unlocked position, and FIG. 4 is a view similar to FIG. 3 showing the same components in a different position;

FIG. 5 is a fragmentary view showing a detail of the door locking mechanism.

Before proceeding to a detailed description of the present invention, it should be pointed out that the door locking assembly which will be described is intimately associated with electrical circuitry involving conductors, switches, a timing device and other components which have not been illustrated in detail. The electrical circuitry, insofar as its description is necessary to the present invention has been illustrated only schematically and, otherwise, is believed to be within the skill of those versed in the art to which the invention relates and is, accordingly, not described specifically.

Figure 1:
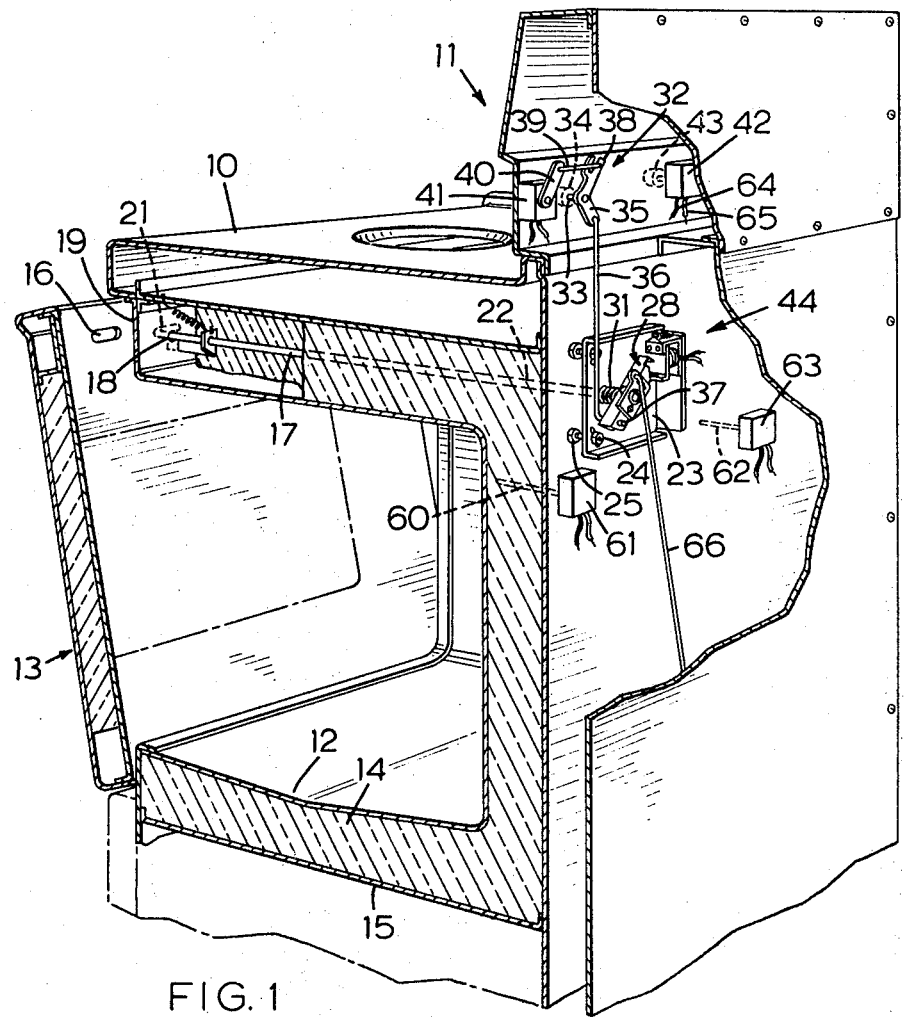
FIG. 1 is a perspective view of a cook stove embodying the said invention with portions thereof cut away in order to show the construction.

Turning now to FIG. 1, a cook stove is illustrated in somewhat simplified form as comprising a casing 10, a control panel 11, an oven cavity liner 12, and a door 13.

While the construction of the stove illustrated is believed to be novel and is the subject of a separate specification filed concurrently herewith and assigned to Moffats, Limited, the assignee herein, specific details of construction will not be described in this specification except to the extent that they are necessary to disclose the invention to which this specification is particularly directed. For the present purposes, it is believed sufficient to point out that the oven cavity defined by the liner 12 is capable of achieving internal temperatures lying within the range of between 800° F. and 1000° F. by means of heating elements which are not shown in the drawing but which are conventionally positioned, conventionally energized and controlled by means of switches and the like carried by the control panel 11. The oven cavity liner 12 is surrounded by insulation 14 and an outer shell 15, the oven assembly then being otherwise supported by the stove construction in a manner which it is believed unnecessary to describe herein in detail.

The door 13 is conventionally hinged to the stove body about a horizontal hinge line adjacent its lower edge and is adapted to close the open forward wall of the oven cavity in a conventional manner. For the purposes of the present invention, it is necessary to note only that the oven door 13 is provided, adjacent its upper edge, with a horizontally arranged, elongated slot 16, the purpose of which will become apparent.

The door locking element itself is constituted by a shaft 17 passing through a snugly fitting circular aperture 18 in the wall 19 of the oven assembly, the exposed end of the shaft 17 being provided with a hooked portion 21 lying at right angles to shaft 17 and adapted to lie, in the "unlocked" position, in a horizontal position, aligned with the slot 16 so that it may freely enter the slot 16 when the door is moved to the closed position from the partly open position in which it is shown in FIG. 1. As long as the hooked portion 21 remains in the horizontal position as shown in FIG. 1, the oven door 13 may be opened and closed without interference and the housewife may obtain access to the oven cavity in an entirely conventional manner.

Associated with the hooked end 21 of the shaft 17 is a safety device illustrated in FIG. 5. The wall 19 of the oven assembly is provided with a vertical slot 70 lying below and to one side of the aperture 18. A bracket 71 is provided having a flange 72 containing an aperture 73 sliding on shaft 17 and having a tab portion 74 passing through the slot 70. The free end of the tab 74 is bent at right angles to form a face 75 opposing the oven door. A shoulder 76 is formed on the bracket 71 to limit its movement outwardly through the slot 70 and the bent portion 75 limits the movement inwardly. A tension spring 77 extending between a mounting hole 78 on flange 73 and a mounting hole 79 on a stationary part 80 of the oven assembly urges the bracket to the position shown in FIG. 5.

In this position, the hooked portion 21 of shaft 17 can not be moved downwardly to a "locked" position when the door is open and result in clipped or damaged enamel on the door if it were to be closed when the portion 21 were not in a position to freely enter the slot 16 in the door. When the door is closed, however, face 75 is contacted by the door and pushed inwardly against spring 77 so as to clear portion 21 and enable it to turn to lock the door in the closed position.

End 22 or shaft 17 passes through the rear wall of the stove through an enlarged aperture (not shown) the diameter of which is substantially greater than the diameter of the shaft 17. Secured to the rear wall of the stove is a plate 23 having a circular aperture therein which snugly receives the end 22 of shaft 17. The plate 23 is mounted in spaced relationship to the rear wall by means of a plurality of nuts 24 carried by bolts 25 secured to the rear wall. Referring to FIG. 3, it will be noted that the plate 23 is secured at three points. Bolt 25A passes through a circular aperture and constitutes a fixed point to support plate 23. Bolts 25B, however, pass through slots 26 which are arcuate slots, lying on an arc, the centre of which is constituted by bolt 25A.

The aperture in the plate 23 through which end 22 of shaft 17 projects is located substantially midway between slots 26 and, accordingly, by pivoting the plate 23 about bolt 25A, the position of the end 22 of shaft 17 may be adjusted within the limit determined by the length of the slots 26 and the diameter of the hole in the rear wall through which shaft 17 passes.

The exposed end 27 of shaft 17 is flattend at 27A and this flattened end is adapted to receive a sheet-metal latching lever 28. Latching lever 28 is of U-shaped cross-section and is provided with a threaded insert 29 to receive locking screw 30 by means of which the latching lever 28 may be firmly secured to shaft 17 and restrained against rotation relative thereto. Shaft 17 projects through plate 23 a distance sufficient for it to accommodate an encircling compression spring 31 lying between plate 23 and latching lever 28. Thus, when shaft 17 has been rotated, substantially through 90°, for end 21 to engage the inner surface of the door 13 below slot 16, the door will be locked in the closed position but, through the compression of spring 31, resiliently held in that position so that an abnormal increase in internal oven pressure would allow the door to move slightly from the closed position (a quarter of an inch or so) to release such internal pressure.

Control panel 11, above the plate 23, carries a bell-crank 32 mounted on a shaft 33 which in turn carries a knob 34 lying on the forward side of the control panel 11 so that the position of the bell-crank 32 may be adjusted by the housewife from the front of the stove. One leg 35 of the bell-crank carries a stiff rod 36 pivotally mounted to leg 35 and pivotally mounted, at 37 to one end of the latching lever 28. The other leg 38 of the bell-crank 32 is linked, by means of element 39, to the operating lever 40 of an electrical switch 41, the function of which will be later described.

Also on the control panel is an electric switch 42 which is operable by knob 43 also lying on the front side of the control panel 11 and accessible to the housewife from the front of the stove.

Figure 2:
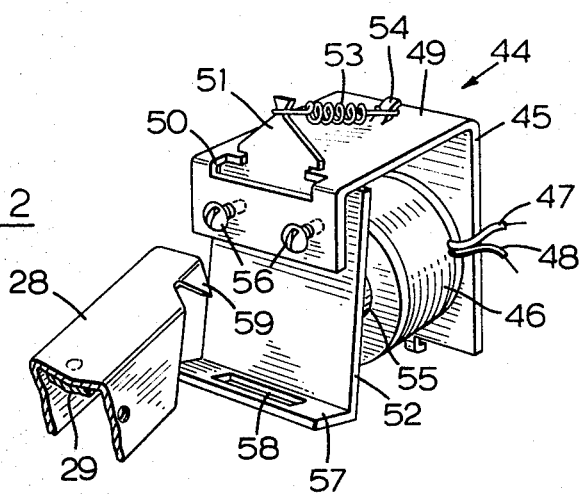
FIG. 2 is a fragmentary detailed view of a portion of the electromechanical latching arrangement.

The plate 23 carries an electrically operated, solenoid latch general indicated by reference numeral 44 in FIG. 1 and illustrated in detail in FIG. 2. In FIG. 2, the solenoid latch 44 can be seen to comprise a bracket 45 carrying an electrical coil 46 which may be energized through leads 47 and 48. The upper horizontal arm 49 of the bracket 45 is provided with an opening 50 adjacent its free end through which projects the tongue 51 of a magnetic armature 52. A spring 53 is secured to the upper end of the tongue 51 and to a tab 54 struck from the material of the bracket 45. The tension spring 53 will normally urge the armature 52 away from the magnetic coil 46 (which is provided with a fixed electromagnetic core 55). The position of the armature 52, when the magnetic coil 46 is not energized, can be adjusted by means of screws 56. The lower end of the armature 52 is provided with a flange 57 extending away from the coil 46 and towards the latching lever 28 and, this flange 57, is provided with a slot 58. The end of the latching lever 28 adjacent the armature 52 is provided with a sharpened projection 59 which, under certain circumstances, is adapted to enter slot 58 as will be more fully described below.

Before proceeding to a description of the operation of the device, it should finally be pointed out that the oven cavity is provided with two temperature sensing devices, one illustrated at 60 and controlling electric switch 61 and another indicated at 62 and controlling electric switch 63. Temperature sensing device 60 and switch 61 are normally involved in the control of oven temperature during the normal cooking function of the oven during which the oven temperature does not normally rise above a temperature of about 500° F. to 550° F. Sensing device 62 and switch 63 control the operation of the oven during the high temperature, pyrolitic action during which the temperature may rise to between 800° F. and 1000° F.

Having described the construction of the door latching assembly which is the subject of the present invention, the operation thereof can now be considered.

As shown in FIG. 1, the oven is in an "unlocked" condition and if the oven heating elements are energized to provide normal cooking temperatures, the stove may be operated as if it were an entirely conventional stove and the door may be opened and closed without interference from the mechanism disclosed.

In the event, however, that it is desired to initiate the self-cleaning pyrolitic action of the oven, certain preparatory steps are taken such as, for example, ensuring that the oven is empty of cooking utensils and the like and that oven control switches for normal cooking operations are in their "off" position.

The first step in initiating the self-cleaning cycle is for the housewife to manipulate control knob 43 so as to close switch 42. Closing switch 42 will, in the first instance, through leads 64 and 65 energize magnetic coil 46, thereby magnetising core 55 and causing armature 52 to move from the position shown in solid lines in FIG. 3 to the position shown in dotted lines in FIG. 3. The coil 46 will remain energized, for the time being, and the movement of the armature 52 to the dotted line position in FIG. 3 will enable the housewife, by manipulating knob 34, to rotate bell-crank 32 in a counterclockwise direction, as seen in FIG. 1. This will have two results. First, by means of link 39, rotation of the bell-crank 32 will cause rotation of switch arm 40 and will close switch 41. This will energize the oven heating elements and the temperature within the oven will begin to rise.

Simultaneously with the energizing of the oven element, rotation of bell-crank 32 will, through link 35 and rod 36, rotate latching lever 28 in a clockwise direction as seen in FIGS. 1 and 3. Since armature 52 has been moved from the solid line position in FIG. 3 to the dotted line position, the projection 59 carried by the end of the latching lever 28 may pass the flange 57 of the armature 52 and move to the dotted line position shown in FIG. 4. The effect of the rotation of the latching lever 28 is, of course, to rotate shaft 17 and to cause the hooked end 21 of the shaft 17 to engage the rearward surface of the door adjacent the slot 16, thereby locking it in the closed position.

Further, it is noted that latching lever 28, in addition to rod 36, also carries rod 66 and rotation of the latching lever will cause rod 66 to move downwardly as shown in FIG. 1 and will, in a manner which need not be described here, initiate the operation of a timing device for the purpose of timing the period during which the high temperature, pyrolitic cleaning action will take place.

It is also important to notice that the energization of the oven heating element by switch 41 does not take place until switch arm 40 has reached the dotted line position shown in FIG. 4. Thus, the oven heating elements cannot be energized until the latching lever 28 has reached at least the dotted line position shown in FIG. 4 in which position its end adjacent the armature 52 is below the level of the flange 57. Normally, however, the knob 34 will be manipulated so as to move the latching lever 28 to the solid line position shown in FIG. 4 and detent means are provided to ensure that this position is achieved.

The initial closing of switch 42, in addition to energizing coil 46, also performs other functions. For one thing, switch 42, upon being closed, removes switch 61 and temperature sensing element 60 from the control circuit of the oven heating elements and connects temperature sensing device 62 and switch 63 in this circuit.

Under the conditions now existing, following the performance of the various functions described above, the door is locked, the high temperature sensing device and switch are in circuit with the oven heating elements and the oven heating elements are in an energized condition and the temperature within the oven is beginning to rise. Magnetic coil 46 is still energized, however, and the self-cleaning cycle can be cancelled by simply manipulating knob 34 so as to rotate it in a clockwise direction as seen in FIG. 1 to unlock the door and to return the latching apparatus to the position shown in FIG. 3 Knob 43 must also be manipulated to disconnect the high temperature sensing device and switch from the oven element circuit and to return control of this circuit to the low temperature sensing device and switch 60 and 61.

Assuming, however, that the self-cleaning cycle is not cancelled, the apparatus will simply remain in the condition previously described with the latching lever at least in the dotted line position shown in FIG. 4, but, more likely, in the solid line position shown in FIG. 4 with the armature 52 still withdrawn and in contact with the magnetic core 55 associated with the coil 46.

As the temperature rises to a level of approximately 550° F., the oven begins to enter the "high temperature" range and switch 63, reacting to this temperature sensed by element 62, opens the circuit energizing coil 46 and thereby releasing armature 52 so that it moves from the dotted line position shown in FIG. 4 to the solid line position shown in FIG. 4. In the solid line position the door is permanently locked and cannot be opened since it is now impossible to return the latching lever 28 from the positions shown in FIG. 4 to the position shown in FIG. 3. The high temperature cycle continues, under the influence of the timer above referred to until a predetermined period of time has elapsed at which point the timer will open the circuit controlling the oven heating elements and the oven will begin to cool down. As the oven cools down to a temperature of about 550° F., this temperature, again sensed by element 62 will cause switch 63 to react to reenergize coil 46, to withdraw armature 52 and make it possible for the housewife to unlock the door by rotating knob 34 so as to return the latching lever 28 from the positions shown in FIG. 4 to the position shown in FIG. 3 which, as also shown in dotted lines in these figures, returns the hooked end 21 of shaft 17 from the locking position shown in FIG. 4 to the unlocked position shown in FIG. 3 with respect to the slot 16 in the door.

From the above description it is to be noted that it is not possible to inadvertently lock the door without first performing the operation which will energize coil 46. An attempt to rotate knob 34 to the door locking position will result in the pointed end of the projection 59 carried by latching lever 28 entering slot 58 in flange 57 of the armature 52 and will prevent the latching lever from moving to the "door locked" position below the flange 57 of the armature 52. Since the latching lever cannot achieve a position below the flange 57, it cannot be locked in that position by the flange 57 of the armature and, accordingly, unless power is applied to the stove (a condition which does not take place in showrooms) the door cannot be inadvertently locked in a manner which would make it impossible to unlock it without the application of power to withdraw armature 52.

Since the locking of the door is controlled by bell-crank 32 which is intimately linked to the switch 41 which energizes the oven heating elements, it can be seen that the oven heating elements cannot be energized for the high temperature cycle without first locking the door. Once the temperature within the oven has reached the lower end of the "high temperature range" the armature 52 is released and the door cannot, thereafter, be unlocked until the temperature has fallen below that level at which time coil 46 is reenergized by switch 63 so that the door can be unlocked.

From the foregoing description, it is believed that the applicant has disclosed a simple, efficient and "fail-safe" latching or locking assembly for an oven door which overcomes the disadvantages of prior art devices and which solves the problems set forth in the introductory portion of this specification.

What we claim as our invention is:

1. Door locking mechanism for a door of an oven having a high temperature oven cleaning cycle comprising oven assembly structure defining an oven cavity, a door adapted to close said cavity, a locking shaft carried by the oven assembly and extending towards the door, a door locking element carried by the end of the shaft extending towards the door, means carried by a control panel associated with the oven assembly structure to rotate the locking shaft between a door locking position and a door unlocked position, electrically energized means to prevent rotation of said locking shaft to the door locking position unless said means are electrically energized, means to energize said electrically energized means when it is desired to lock the door and temperature responsive means to de-energize the electrically energized means to prevent rotation of the locking shaft from the door locking position to the door unlocked position when the temperature in the oven is above a predetermined value.

2. Door locking mechanism as claimed in claim 1 wherein the means to rotate the locking shaft between the door locking position and the door unlocked position comprises a bell-crank operated by a knob exposed on said control panel, said bell-crank being linked, first to a lever carried by the locking shaft to effect its rotation and second to an electrical switch controlling oven heating elements so that said oven heating elements may not be energized unless the locking shaft is in the door locked position.

3. Door locking mechanism as claimed in claim 1 wherein the electrically energized means comprises a solenoid having an armature extending into the path of a lever carried by said door locking shaft when said solenoid is de-energized thereby preventing rotation of said door locking shaft and adapted to be withdrawn to clear said lever when said solenoid is energized so as to permit rotation of said door locking shaft.

References Cited

UNITED STATES PATENTS

| | | | |
|---|---|---|---|
| 3,125,365 | 3/1964 | Eigelbach | 126—197 X |
| 3,313,918 | 4/1967 | Barber | 126—197 X |
| 3,469,568 | 9/1969 | Torrey et al. | 126—197 X |

CARROLL B. DORITY, JR., Primary Examiner